United States Patent Office 3,437,648
Patented Apr. 8, 1969

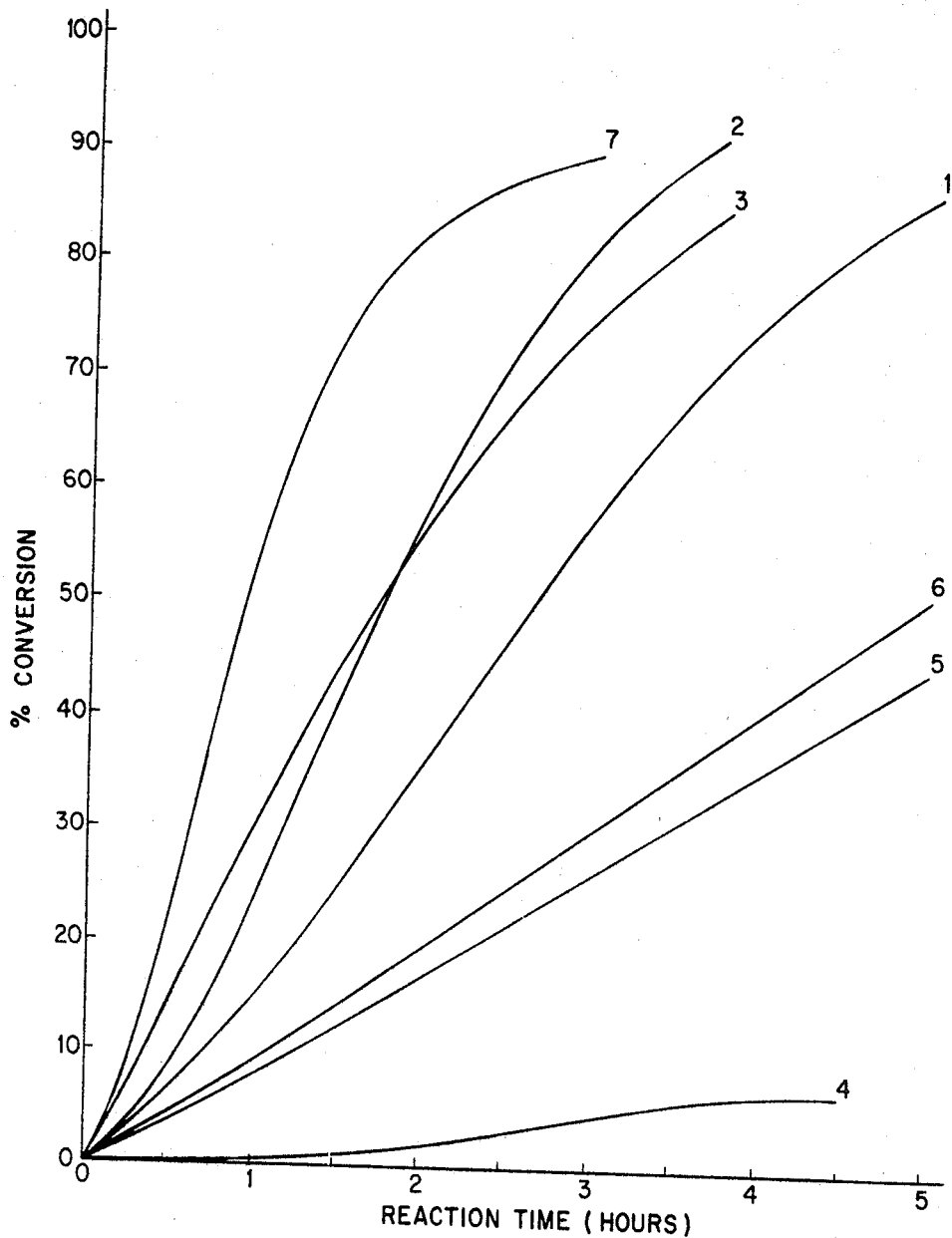

3,437,648
PROCESS FOR POLYMERIZING VINYL FLUORIDE IN AQUEOUS SUSPENSION-FREE RADIAL SYSTEM WITH 1,1,2 - TRICHLOROTRIFLUOROETHANE AS AN ACCELERATOR
Joseph J. Dietrich, Painesville, Ohio, assignor to Diamond Shamrock Corporation, a corporation of Delaware
Filed Oct. 5, 1964, Ser. No. 401,530
Int. Cl. C08f 1/60, 3/22
U.S. Cl. 260—92.1
15 Claims

ABSTRACT OF THE DISCLOSURE

Preparation of polymers by an aqueous suspension process includes polymerizing an ethylenically unsaturated compound in the presence of a free radical catalyst, water and a lower chlorofluoroalkyl hydrocarbon containing at least one fluorine-substituted atom acting as a reaction accelerator.

---

The present invention relates to a process for the polymerization of ethylenically unsaturated compounds. More particularly, the present invention relates to an improved process for the polymerization of vinyl halides. Specifically, the present invention relates to an improved catalyst system for use in the polymerization of vinyl fluoride-containing compounds.

There are several methods for polymerizing ethylenically unsaturated compounds now known and practiced commercially. In general, these methods include emulsion, suspension and bulk polymerization techniques. In each of these polymerization systems the catalyst functions in the polymerization process as a free radical generator. As is known to those skilled in the art, a free radical initiation mechanism involves dissociation of the catalyst into free radicals which can then initiate polymer radials by reaction with the polymerizable monomer to form new free radicals which, in turn, combine with more monomer molecules to form still other free radicals. In this manner, long polymeric chains are propagated. This reaction continues until either the free radical-bearing polymer fragment encounters another free radical or the monomer is exhausted or inhibitors are added to the system causing a cessation of the polymerization reaction.

Exemplary of free radical-type catalysts generally employed in a suspension polymerization system are the water-insoluble organic peroxides, e.g., benzoyl peroxide, diisopropyl-benzene monohydroperoxide, acetyl peroxide, di-tertiary-butyl peroxide, a,a'-azo-bis-isobutylnitrile, p-methane hydroperoxide, lauroyl peroxide, acetyl benzoyl peroxide, succinyl peroxide, peracetic acid, m-bromo-benzoyl peroxide, persuccinic acid, urea peroxide, dialkyl peroxy dicarbonate, ascaridole, cyclohexanone peroxide, and the like.

Exemplary of free radical-type catalysts useful in emulsion and bulk polymerization methods include the following water-soluble catalysts: water-soluble salts of inorganic per acids, e.g., ammonium persulfate, potassium persulfate, potassium perphosphate, potassium percarbonate; organic peroxides which contain hydrophyllic groupings of sufficient effect to render them water-soluble, e.g., beta, beta'-biscarboxypropionyl peroxide, t-butyl hydrogen peroxide; alkali metal salts of carboxylic azonitriles, e.g., alpha, alpha'-azobis (alpha-methyl-gamma-carboxybutyronitrile), alpha, alpha'-azobis (alpha, gamma, gamma-trimethyl-gamma-carboxybutyronitrile), etc.; and inorganic acid salts of azoamidines, e.g., the dihydrochlorides of 2,2'-diguanyl-2,2'-azopropane, 2,2'-diguanyl-2,2'-azobutane, 2,2' - bis - (N-phenylguanyl)-2,2'-azopropane, etc.

While generally the use of the free radical-type catalyst has proved in most instances satisfactory, it has now been found that polymerization in systems susceptible to free radical initiation is effected at a faster rate than heretofore feasible without a reduction in molecular weight by conducting the polymerization reaction in the presence of a halogen-substituted alkyl hydrocarbon, preferably a lower alkyl of about one to four carbon atoms, containing at least one fluorine-substituted atom.

Exemplary of suitable halogen-substituted alkyl hydrocarbons containing at least one fluorine-substituted atom include the following: dichlorofluoromethane, dichlorotetrafluoroethane, trichlorofluoromethane, tetrachlorodifluoroethane, trichlorotrifluoroethane, monochloropentafluoroethane, and mixtures thereof.

The amount of the halogen-substituted alkyl hydrocarbon employed in the polymerization system may vary within the range from about 0.01 to 40, preferably about 1 to 25 parts, by weight, per 100 parts of the ethylenically unsaturated compound. The amount of the free radical catalyst employed may vary within the range from about 0.01 to 10, preferably about 0.1 to 5 parts, by weight, per 100 parts of the ethylenically unsaturated compound. The quantity of water employed is generally within the range from about 0.05 to 10, preferably about 1 to 5 times, by volume, of the total quantity of the ethylenically unsaturated compound present in the reaction zone. While specific reference is made herein to an aqueous polymerization system, water does not need to be present to produce satisfactory polymer. Polymer can be produced when the halogen-substituted alkyl hydrocarbon is employed as the sole reaction medium. In such cases the halogen-substituted alkyl hydrocarbon may be present in an amount from about 0.5 to 10, preferably 1 to 5 times, by volume, the total quantity of the ethylenically unsaturated compound present in the reaction zone.

Besides the presence of the unsaturated compound, catalyst, the halogen-substituted alkyl hydrocarbon and water, a surface-active agent may be employed in amounts ranging from 0.01 to 10, preferably about 0.1 to 1, parts, by weight, per 100 parts of the ethylenically unsaturated compound. Illustrative of suitable suspending agents are methyl cellulose, e.g., as disclosed in U.S. Patent 2,538,051, gelatin, polyvinyl alcohol and the like. Also, chain transfer agents may be used to control the polymer's molecular weight. Such chain transfer agents include water-miscible organic solvents which may be present in the system in amounts from about 1 to about 30% by weight of the water employed. Suitable water-miscible organic solvents include the lower aliphatic alcohols of from 1 to 4 carbon atoms, e.g., methanol, ethanol and isopropyl alcohol. Other suitable chain transfer agents include ketones, aliphatic and aromatic hydrocarbons as well as halogenated hydrocarbons.

The process of the present invention is applicable to the polymerization of ethylenically unsaturated monomers and comonomers capable of being polymerized by a free radical mechanism. The present process is particularly applicable to polymerizable compounds which contain the $CH_2=C<$ group, especially to vinyl fluoride-containing compounds, i.e., monomers and comonomers, wherein vinyl fluoride is present in substantial amounts, i.e., at least about 25%, preferably about 50% of the total by weight. Examples of ethylenically unsaturated compounds are ethylene, propylene, isobutylene, pentenes and styrene; halogen-substituted monoethylenic hydrocarbons, e.g., vinyl fluoride, vinyl chloride, vinyl bromide, 1,1-dichloroethylene, 1,1-difluoroethylene, difluorochloroethylene, trifluorochloroethylene, tetrachloroethylene, trifluoropropylene, difluoroisobutylene; vinyl esters, e.g., vinyl formate, vinyl acetate, vinyl propionate, vinyl butyrate, vinyl benzoate, vinyl pivalate, vinyl stearate, vinyl salicylate, and vinyl esters of inorganic acids; vinyl ethers, e.g., vinyl ethyl ether, tetrafluoroethyl allyl ether and vinyl dioxolane; vinyl ketones, e.g., methyl vinyl ketone; N-vinyl imides, e.g., N-vinyl succinimide and N-vinyl phthalimide; acrylic and methacrylic acids and their derivatives, e.g., esters, nitriles, amides, anhydrides and acid halides, including methyl methacrylate, beta-hydroxyethyl methacrylate, allyl methacrylate, acrylonitrile, N-butylmethylacrylamide, N-allyl morpholine, etc.; derivatives of maleic and fumaric acids, e.g., diethyl maleate and dimethyl fumarate; propenyl esters, e.g., allyl acetate, isopropenyl acetate, etc.

The temperature employed in the polymerization will depend to a certain extent upon the particular monomer or comonomer being polymerized and also upon the catalyst selected for the purpose. In general, however, polymerization temperatures may range between about 0° C. and 250° C., with a preferred temperature range between about 25° C. and 200° C. in conjunction with a suitably high pressure to maintain the monomer or comonomer and water in a fluid state, i.e., gas, liquid or gas-liquid. Pressures may range from atmospheric up to about 20,000 lbs. per square inch gauge (p.s.i.g.) with a preferred pressure range from about 300 to 10,000 p.s.i.g.

water. The reaction mixture is continuously agitated with a mechanical stirrer. The concentration of the reactants, expressed as parts by weight, and processing conditions are given in Table I.

Inherent viscosity, a measure of molecular weight, is determined by dissolving the polymer in N,N-dimethyl acetamide at 110° C., and then measuring at this temperature the viscosity of the polymer solution relative to that of N,N-dimethyl acetamide obtained in the same manner. The time of efflux through a viscometer is measured for the solvent and for the solution of polymer in solvent. The concentration of polymer in the solution is 0.1 gram per 100 ml. of solvent. From the efflux values obtained inherent viscosity is calculated as follows:

$T_0$ = solvent flow time in seconds
$T_1$ = solution flow time in seconds
Relative viscosity = $T_1/T_0$ $$\text{Inherent Viscosity}\left(\frac{N_{sp}}{C}\right) = \text{a natural logarithm } \frac{\text{of relative viscosity}}{C}$$

where C is the concentration of polymer as expressed in grams per 100 ml. of solvent.

TABLE I

| Run No. | 1 | 2 | 3 | 4 | 5 | 6 | 7 |
|---|---|---|---|---|---|---|---|
| Vinyl fluoride monomer | 90.80 | 90.80 | 90.80 | 90.80 | 90.80 | 90.80 | 90.80 |
| Methocel solution [1] | 5.80 | 5.80 | 5.80 | 5.80 | 5.80 | 5.80 | 5.80 |
| Lauroyl peroxide | 0.38 | 0.38 | 0.38 | 0.38 | 0.38 | 0.38 | 0.38 |
| Isopropanol | 4.05 | 4.05 | | | | | |
| Cyclohexane | | | 5.60 | | | | |
| Toluene | | | | 6.10 | | | |
| Benzene | | | | | 5.20 | | |
| Carbon tetrachloride | | | | | | 10.30 | |
| 1,1,2-trichlorotrifluoro-ethane | | | | | | | 12.50 |
| Temperature (° C.) | 65 | 65 | 65 | 65 | 65 | 65 | 65 |
| Pressure (p.s.i.g.) | 5,000 | 5,000 | 5,000 | 5,000 | 5,000 | 5,000 | 5,000 |
| Inherent viscosity (Nsp/C) | 1.24 | 1.08 | 1.26 | 0.82 | 4.12 | 0.20 | 4.32 |

[1] Methocel solution, a 4.95% by weight, aqueous solution of a methoxylated propoxylated cellulose (Methocel 65-HG-50).

The time of polymerization will depend upon the particular monomer or comonomer being polymerized, the catalyst, the temperature of the polymerization zone and the amount of the halogen-substituted alkyl hydrocarbon employed. At the lower part of the concentration of the halogen-substituted alkyl hydrocarbon, polymerization is slow unless the higher temperature range is used. In general, polymerization time is between about 1 hour and 10 hours, preferably between 2 and 5 hours. The polymerization can be carried out using either a batch or continuous technique with controlled agitation of the reaction mixture generally necessary.

Polymers of ethylenically unsaturated compounds, especially the vinyl fluoride-containing resins, have found extensive uses in the lacquer and coating fields because of their combination of desirable properties. For example, coatings and lacquers of polyvinyl fluoride exhibit resistance to atmospheric elements, to chemicals, water and most solvents; they are free of odor, taste and toxicity. They are strong, flexible and tough and they also possess a high finish and good durability.

In order that those skilled in the art may more completely understand the present invention and the preferred methods by which the same may be carried into effect, the following specific examples may be offered.

Example 1

Into a 2-liter high pressure-stirred autoclave are charged lauroyl peroxide, an aqueous solution containing 4.95%, by weight, Methocel 65-HG-50 (a methoxylated propoxylated cellulose) and select polymerization aids. The autoclave is then brought under a vacuum at which time water and vinyl fluoride monomer are introduced into the autoclave. The reaction mixture is heated to 65° C. and the pressure is brought up to 5000 p.s.i.g. and maintained at that pressure by the continuous addition of For purposes of comparison, the percent conversion after 3 hours of the vinyl fluoride monomer to the polymer employing the various polymerization systems are set forth in Table II. Also presented in Table II is a comparison of the inherent viscosities of the polymer products.

TABLE II

| Polymerization aid | Percent conversion after 3 hrs. | Inherent viscosity (Nsp/C) |
|---|---|---|
| Isopropanol | 58.0 | 1.24 |
| Cyclohexane | 75.0 | 1.26 |
| Toluene | 4.5 | 0.82 |
| Benzene | 28.0 | 4.12 |
| Carbontetrachloride | 30.3 | 0.20 |
| 1,1,2-trichlorotrifluorethane | 90.0 | 4.32 |
| None | | 5.20 |

As can be readily seen from a comparison of this data, the polyvinyl fluoride prepared by the polymerization system containing 1,1,2-trichlorotrifluoroethane is produced at a faster rate of conversion than the other systems without a decrease in its molecular weight.

The figure is a graphic representation of the results of Example 1.

Example 2

Into a 2-liter high pressure-stirred autoclave are charged 2 grams of lauroyl peroxide, 20 grams of the Methocel solution and 5 grams of n-allyl morpholine. No halogen-substituted lower alkyl hydrocarbon containing at least one fluorine-substituted atom is present in this system. The autoclave is then brought under a vacuum at which time water containing another 20 grams of the n-allyl morpholine and 450 grams of vinyl fluoride monomer is continuously introduced into the reaction zone as the reaction proceeds. The reaction temperature is 65° C.

and a pressure of 5000 p.s.i.g. is maintained by the continuous introduction of the water as the reaction proceeds. The mixture is continuously agitated. The reaction is continued for a period of 19 hours after which time conversion of the comonomer to the copolymer is about 15%.

Example 3

Example 2 is repeated except that the amount of n-allyl morpholine utilized is 15 grams, 14 grams of which is dissolved in 350 cc. of 1,1,2-trichlorotrifluoroethane and continuously added to the autoclave during the run. The reaction is permitted to proceed for 22 hours and a 50% conversion of the comonomer to the vinyl fluoride-n-allylmorpholine copolymer is effected.

Example 4

Example 2 is repeated except that 50 grams of 2-methyl pentene-1 is copolymerized with the vinyl fluoride. The reaction is allowed to proceed for 17 hours after which time a conversion of approximately 10% is achieved.

Example 5

Example 4 is repeated except that the amount of 2-methyl pentene-1 utilized is 15 grams, 14 grams of which is dissolved in 350 cc. of 1,1,2-trichlorotrifluoroethane and continuously added to the autoclave during the run. The reaction is allowed to proceed for 17.5 hours and a conversion to the copolymer of between 80 and 90 percent is achieved.

It is to be understood that although the invention has been described with specific reference to particular embodiments thereof, it is not to be so limited since changes and alterations therein may be made which are within the full intended scope of this invention as defined by the appended claims.

It is claimed:

1. An aqueous suspension process for preparing vinyl fluoride polymers from vinyl fluoride through use of a free radical initiation mechanism which comprises polymerizing vinyl fluoride in the presence of a free radical catalyst and 1,1,2-trichlorotrifluoroethane, the process having greater than 75 percent conversion of the vinyl fluoride within three hours of processing time, the 1,1,2-trichlorotrifluoroethane acting as a reaction accelerator.

2. The process of claim 1 wherein the vinyl fluoride polymer is a copolymer containing at least 25% vinyl fluoride.

3. The process of claim 1 where the vinyl fluoride polymer is a homopolymer.

4. The process of claim 1 wherein polymerization is effected at a temperature within the range from 0° C. to 250° C. and a pressure from atmospheric up to 20,000 p.s.i.g.

5. The process of claim 1 wherein the free radical catalyst is an organic peroxide.

6. The process of claim 5 wherein the catalyst is present in the polymerization system in an amount within the range from 0.01 to 10 parts, by weight, per 100 parts of vinyl fluoride.

7. The process of claim 1 wherein the 1,1,2-trichlorotrifluoroethane is present in the polymerization system in an amount within the range from 0.01 to 40 parts, by weight, per 100 parts of vinyl fluoride.

8. An aqueous suspension process for preparing vinyl fluoride polymers from vinyl fluoride by a free radical initiation mechanism which comprises polymerizing said vinyl fluoride in an aqueous system at a temperature within the range from 0° C. to 250° C. and a pressure from atmospheric up to 20,000 p.s.i.g. in the presence of 0.01 to 10 parts, by weight, per 100 parts of said vinyl fluoride of a free radical catalyst and 0.01 to 40 parts, by weight, of 1,1,2-trichlorofluoroethane the process having greater than 75 percent conversion of the vinyl fluoride within three hours of processing time, and the 1,1,2-trichlorotrifluoroethane acting as a reaction accelerator.

9. The process of claim 8 wherein the vinyl fluoride polymer is a copolymer containing at least 25% vinyl fluoride.

10. The process of claim 8 wherein the vinyl fluoride polymer is a homopolymer.

11. The process of claim 8 wherein polymerization is effected at a temperature from 25° C. to 200° C. and a pressure from 300 to 10,000 p.s.i.g.

12. The process of claim 8 wherein the free radical catalyst is present in the polymerization system in an amount from 0.1 to 5 parts, by weight, per 100 parts of vinyl fluoride.

13. The process of claim 8 wherein the 1,1,2-trichlorotrifluoroethane is present in the polymerization system in an amount from 1 to 25 parts, by weight, per 100 parts of vinyl fluoride.

14. An aqueous suspension process for preparing polymers of a vinyl fluoride-containing compound which comprises polymerizing said vinyl fluoride-containing compound in an aqueous system at a temperature in the range from 25° C. to 200° C. and at a pressure in the range of 300 to 10,000 p.s.i.g. in the presence of 0.01 to 5 parts, by weight, of an organic peroxide catalyst, per 100 parts vinyl fluoride compound and 1 to 25 parts by weight, of 1,1,2-trichlorotrifluoroethane per 100 parts vinyl fluoride-containing compound, the process having greater than 75 percent conversion of the vinyl fluoride within three hours of processing time and the 1,1,2-trichlorofluoroethane acting as a reaction accelerator.

15. The process of claim 14 wherein the vinyl fluoride-containing compound contains at least 25% vinyl fluoride.

References Cited

UNITED STATES PATENTS

| 2,700,661 | 1/1955 | Miller | 260—92.1 |
| 2,784,176 | 3/1957 | Dittman et al. | 260—92.1 |
| 2,988,542 | 6/1961 | Bro et al. | 260—92.1 |
| 3,265,678 | 8/1966 | Hecht | 260—92.1 |

OTHER REFERENCES

E. Trommsdorff and C. E. Schildknecht: Polymerization in Suspension, in Polymer Processes, ed. by C. E. Schildknecht, Interscience Publishers Inc., N.Y., 1956, pp. 83–85.

JOSEPH L. SCHOFER, Primary Examiner.

J. A. DONAHUE, JR., Assistant Examiner.

U.S. Cl. X.R.

260—85.5, 85.3, 85.7, 86.1, 86.3, 86.7, 87.1, 87.3, 78.5, 87.5, 87.7, 88.7, 89.1, 89.7, 91.1, 91.5, 92.8, 93.7, 94.8, 935, 94.9, 63, 80